(12) United States Patent
Ji et al.

(10) Patent No.: US 10,144,342 B2
(45) Date of Patent: Dec. 4, 2018

(54) MOBILE ROBOT

(71) Applicant: Dyson Technology Limited, Wiltshire (GB)

(72) Inventors: Ze Ji, Portsmouth (GB); Christopher Andrew Smith, Bristol (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 182 days.

(21) Appl. No.: 14/843,442

(22) Filed: Sep. 2, 2015

(65) Prior Publication Data

US 2016/0059770 A1    Mar. 3, 2016

(30) Foreign Application Priority Data

Sep. 3, 2014  (GB) .................................. 1415605.3

(51) Int. Cl.
| | |
|---|---|
| *G01C 22/00* | (2006.01) |
| *G05D 1/00* | (2006.01) |
| *H04N 7/00* | (2011.01) |
| *H04N 7/18* | (2006.01) |
| *B60Q 1/24* | (2006.01) |
| *B60R 1/00* | (2006.01) |
| *H04N 5/225* | (2006.01) |
| *G05D 1/02* | (2006.01) |

(52) U.S. Cl.
CPC ................. *B60Q 1/24* (2013.01); *B60R 1/00* (2013.01); *G05D 1/0246* (2013.01); *H04N 5/2256* (2013.01); *H04N 7/181* (2013.01); *B60R 2300/101* (2013.01); *B60R 2300/30* (2013.01); *B60R 2300/80* (2013.01); *G05D 2201/0203* (2013.01); *Y10S 901/01* (2013.01); *Y10S 901/47* (2013.01)

(58) Field of Classification Search
CPC ........ A47L 2201/04; G05D 2201/0203; G05D 2201/0215
See application file for complete search history.

(56) References Cited

U.S. PATENT DOCUMENTS

| | | | |
|---|---|---|---|
| 5,652,489 | A | 7/1997 | Kawakami |
| 5,870,490 | A | 2/1999 | Takahashi et al. |

(Continued)

FOREIGN PATENT DOCUMENTS

| | | |
|---|---|---|
| CN | 101358714 | 2/2009 |
| DE | 10 2014 100 346 | 7/2015 |

(Continued)

OTHER PUBLICATIONS

Search Report dated Feb. 18, 2015; directed to GB Application No. 1415605.3; 1 page.

(Continued)

*Primary Examiner* — Rebecca A Volentine
(74) *Attorney, Agent, or Firm* — Morrison & Foerster LLP

(57) ABSTRACT

A mobile robot comprising: a vision system, the vision system comprising a camera and two or more light sources each arranged to provide a level of illumination to an area surrounding the mobile robot; wherein the two or more light sources are arranged to illuminate separate areas surrounding the robot corresponding to different sections of an image captured by the camera, and the level of illumination provided by each of the light sources is independently adjustable.

14 Claims, 8 Drawing Sheets

(56) References Cited

U.S. PATENT DOCUMENTS

| | | |
|---|---|---|
| 8,761,594 B1 | 6/2014 | Gross et al. |
| 9,119,512 B2 | 9/2015 | Martins, Jr. et al. |
| 9,149,167 B2 | 10/2015 | Hong et al. |
| 2002/0174506 A1 | 11/2002 | Wallach et al. |
| 2004/0167667 A1 | 8/2004 | Goncalves et al. |
| 2005/0065655 A1 | 3/2005 | Hong et al. |
| 2006/0023105 A1* | 2/2006 | Kostrzewski ......... G06T 3/0018 348/335 |
| 2006/0034537 A1* | 2/2006 | Masaki ............. G06K 9/00362 382/254 |
| 2006/0123582 A1 | 6/2006 | Tani |
| 2007/0061040 A1* | 3/2007 | Augenbraun ........... A47L 5/225 700/245 |
| 2008/0237445 A1* | 10/2008 | Ikeno .................. G01S 17/32 250/205 |
| 2008/0276407 A1* | 11/2008 | Schnittman ............. A47L 11/34 15/319 |
| 2009/0028387 A1 | 1/2009 | Jeong et al. |
| 2009/0228165 A1* | 9/2009 | Ozick ..................... A47L 5/30 701/23 |
| 2010/0188510 A1 | 7/2010 | Yoo et al. |
| 2010/0222925 A1 | 9/2010 | Anezaki |
| 2010/0268385 A1 | 10/2010 | Rew et al. |
| 2011/0206237 A1 | 8/2011 | Saruta et al. |
| 2012/0062713 A1 | 3/2012 | Flinsenberg et al. |
| 2012/0155748 A1 | 6/2012 | Shin |
| 2012/0182392 A1 | 7/2012 | Kearns et al. |
| 2012/0232697 A1 | 9/2012 | Lee et al. |
| 2012/0260944 A1 | 10/2012 | Martins, Jr. et al. |
| 2012/0323365 A1 | 12/2012 | Taylor et al. |
| 2012/0326611 A1 | 12/2012 | Nanahara et al. |
| 2013/0056032 A1 | 3/2013 | Choe et al. |
| 2013/0216098 A1* | 8/2013 | Hasegawa ........... G05D 1/0274 382/103 |
| 2013/0229518 A1 | 9/2013 | Reed et al. |
| 2013/0331990 A1 | 12/2013 | Jeong et al. |
| 2014/0036062 A1 | 2/2014 | Yoon et al. |
| 2014/0129027 A1* | 5/2014 | Schnittman .......... G05D 1/0219 700/253 |
| 2014/0240464 A1 | 8/2014 | Lee |
| 2014/0304937 A1* | 10/2014 | Kim ...................... A47L 9/28 15/319 |
| 2014/0324270 A1* | 10/2014 | Chan ................... G01S 17/42 701/28 |
| 2014/0350839 A1* | 11/2014 | Pack .................... G01C 21/30 701/409 |
| 2015/0098616 A1 | 4/2015 | Gervautz et al. |
| 2015/0128996 A1* | 5/2015 | Dooley ................ A47L 11/125 134/6 |
| 2016/0059420 A1 | 3/2016 | Ji et al. |
| 2016/0264262 A1 | 9/2016 | Colin et al. |
| 2017/0285651 A1 | 10/2017 | Ji et al. |

FOREIGN PATENT DOCUMENTS

| | | |
|---|---|---|
| EP | 1 517 210 | 3/2005 |
| EP | 2 386 877 | 11/2011 |
| EP | 2 423 772 | 2/2012 |
| EP | 2 631 730 | 8/2013 |
| GB | 2 259 823 | 3/1993 |
| GB | 2 394 797 | 5/2004 |
| GB | 2509814 | 7/2014 |
| JP | 6-139341 | 5/1994 |
| JP | 6-300542 | 10/1994 |
| JP | 2000-342497 | 12/2000 |
| JP | 2003-136456 | 5/2003 |
| JP | 2004-21774 | 1/2004 |
| JP | 2012-185728 | 9/2012 |
| JP | 2013-12200 | 1/2013 |
| JP | 2013-252431 | 12/2013 |
| JP | 2014-514091 | 6/2014 |
| KR | 10-2008-0090367 | 10/2008 |
| KR | 10-2009-0098513 | 9/2009 |
| KR | 10-2009-0119637 | 11/2009 |
| KR | 10-2010-0098997 | 9/2010 |
| KR | 10-2010-0098999 | 9/2010 |
| WO | WO-2004/059900 | 7/2004 |
| WO | WO-2007/051972 | 5/2007 |
| WO | WO-2007/083459 | 7/2007 |
| WO | WO-2008/118004 | 10/2008 |
| WO | WO-2008/120961 | 10/2008 |
| WO | WO-2009/063318 | 5/2009 |
| WO | WO-2014/033055 | 3/2014 |
| WO | WO-2015/059241 | 4/2015 |

OTHER PUBLICATIONS

International Search Report and Written Opinion dated Nov. 20, 2015, directed to International Application No. PCT/GB2015/052324; 9 pages.

Guizzo, E. Oct. 18, 2011. "How Google's Self-Driving Car Works," located at http://spectrum.ieee.org/automaton/robotics/artificial-intelligence/how-google-self-driving-car-works, retrieved on Feb. 16, 2015; 4 pages.

Ji et al., U.S. Office Action dated Mar. 24, 2017, directed to U.S. Appl. No. 14/843,416; 18 pages.

Ji et al., U.S. Office Action dated Sep. 27, 2017, directed to U.S. Appl. No. 14/843,416; 17 pages.

* cited by examiner

MOBILE ROBOT

REFERENCE TO RELATED APPLICATIONS

This application claims priority of United Kingdom Application No. 1415605.3, filed on Sep. 3, 2014, the entire contents of which are incorporated herein by reference.

FIELD OF THE INVENTION

The present invention relates to a mobile robot and in particular to a mobile robot capable of illuminating its surroundings.

BACKGROUND OF THE INVENTION

Mobile robots are becoming increasingly commonplace and are used in such diverse fields as space exploration, lawn mowing and floor cleaning. Recently there has been a rapid advancement in the field of robotic floor cleaning devices, especially vacuum cleaners, the primary objective of which is to navigate a user's home autonomously and unobtrusively whilst cleaning the floor.

In performing this task, a robotic vacuum cleaner has to navigate the area which it is required to clean. Some robots are provided with a rudimentary navigation system whereby the robot uses what is sometimes referred to as a "random bounce" method whereby the robot will travel in any given direction until it meets an obstacle, at which time the robot will turn and travel in another random direction until another obstacle is met. Over time, it is hoped that the robot will have covered as much of the floor space requiring to be cleaned as possible. Unfortunately, these random bounce navigation schemes have been found to be lacking, and often large areas of the floor that should be cleaned will be completely missed.

Accordingly, better navigation methods are being researched and adopted in mobile robots. For example, Simultaneous Localisation and Mapping (SLAM) techniques are now starting to be adopted in some robots. These SLAM techniques allow a robot to adopt a more systematic navigation pattern by viewing, understanding, and recognising the area around it. Using SLAM techniques, a more systematic navigation pattern can be achieved, and as a result, in the case of a robotic vacuum cleaner, the robot will be able to more efficiently clean the required area.

Robots that use SLAM techniques need a vision system that is capable of capturing still or moving images of the surrounding area. High contrast features (sometimes referred to as landmark features) within the images such as the corner of a table or the edge of a picture frame are then used by the SLAM system to help the robot build up a map of the area, and determine its location within that map using triangulation. In addition, the robot can use relative movement of features that it detects within the images to analyse its speed and movement.

SLAM techniques are extremely powerful, and allow for a much improved navigation system. However, the SLAM system can only function correctly provided it is able to detect enough features within the images captured by the vision system. As such, it has been found that some robots struggle to successfully navigate in rooms that have low-light conditions or where the images captured by the vision system suffer from poor contrast. Some robots are therefore restricted to navigating during the day when there is sufficient ambient light available. In the case of a robotic floor cleaner, this may not be desirable because a user may wish to schedule their robot floor cleaner to clean at night while they are sleeping. To overcome this problem, some robots have been provided with a light which acts as a headlight that can be turned on and off as required to improve images captured by a camera, and assist the robot to see in the direction in which it is travelling. An example of this is described in US 2013/0056032.

However, there are problems associated with using headlights on robots. In order that autonomous robots can navigate freely around an area that may contain obstacles such as furniture, they are typically provided with an on-board power source in the form of a battery. The use of headlights can decrease the battery life of the robot, which means that the robot will be forced to return to a charging station within a smaller amount of time. This in turn means that the robot will only be able to clean a smaller area between charges than it would have otherwise been able to if it did not have to use headlights to navigate.

SUMMARY OF THE INVENTION

This invention provides a mobile robot comprising: a vision system, the vision system comprising a camera and two or more light sources each arranged to provide a level of illumination to an area surrounding the mobile robot; wherein the two or more light sources are arranged to illuminate separate areas surrounding the robot corresponding to different sections of an image captured by the camera, and the level of illumination provided by each of the light sources is independently adjustable.

As a result, the robot can navigate better within environments that have areas in which there is a variation in the ambient light levels. It is able to provide different levels of illumination to different areas around it at the same time, the different levels of illumination being specified according to the ambient light level and level of contrast in those areas within the captured image. This can result in a more energy efficient robot as it does not provide unnecessarily high levels of illumination to areas that do not need it, and can also increase the battery life of the robot.

The mobile robot may further comprise a control system, the control system comprising a feature detection unit for detecting features within images captured by the vision system, and wherein the level of illumination provided by each one of the two or more light sources is independently adjusted in response to the number of features detected by the feature detection unit within the image captured by the camera. As a result, the level of illumination can be adjusted in direct response to the ability of the robot to successfully navigate. Because of this direct link, the amount of power being supplied to the light sources is always the absolute minimum required by the robot to function correctly, without any extra power being wasted.

The level of illumination provided by each of the light sources may be independently adjusted in response to the number of features detected by the feature detection unit within the corresponding sections of the image illuminated by each light source. Accordingly, the robot is able to select which of multiple light sources to use to increase the level of illumination. This is a more efficient use of power as the robot can more accurately illuminate a specific area that has low ambient light or poor contrast.

The two or more light sources may be arranged to illuminate a combined area that corresponds to between a quarter and three quarters of the overall image captured by the camera. Full illumination of the entire image is not required by the robot to successfully navigate, and so by only providing the robot with the ability to illuminate a portion of the overall image, a more energy efficient robot is achieved, and the battery life can be extended. In addition, fewer light sources are required to illuminate only a portion of the overall image, and so the cost of manufacturing the robot can be kept down.

The two or more light sources may be arranged on the robot such that they illuminate separate areas that are on opposite sides of the robot. This allows the robot to navigate using features it has selected within the image that are spaced apart. Triangulation using features that are spaced apart allows for a much more accurate navigation system.

When the vision system comprises two light sources, each light source may be arranged on opposite sides of the robot to emit light in an opposite direction to the other light source. The robot will therefore be able to triangulate itself within an environment more accurately, and can also use relative movement of features each side of the robot within different images captured by the camera to more accurately detect the speed and trajectory of the robot.

The vision system may comprise at least four light sources, and the at least four light sources are arranged to illuminate a different quadrant area surrounding the robot. This gives the robot even more control over which areas to illuminate, and further accentuates the benefits already discussed above in relation to this.

The level of illumination provided by each of the light sources may be adjusted by increasing and decreasing the power provided to each of the light sources. This allows the power provided to each light source to be reduced when the light source is not required to provide a significant level of illumination. This efficient use of power can extend the battery life of the robot.

The level of illumination provided by each of the light sources may be independently adjusted in response to a control signal sent to the vision system by a control system. The control system may comprise a simultaneous localisation and mapping (SLAM) unit. As a result, the system that is responsible for navigation on the robot has direct control over the level of illumination provided by the light sources. This can improve the responsiveness of the adjustments made to the level of illumination in response to navigational requirements of the robot.

The camera may be a panoramic annular lens (PAL) camera. This allows the robot to capture images that provide a complete 360° view of the area surrounding the robot, which in turn allows for a much improved navigation system which is not easily blinded by nearby obstructions.

The light sources may comprise light-emitting diodes (LEDs). LEDs are particularly energy efficient and consume much less power than some other forms of light source, such as incandescent bulbs, and so the battery life of the robot can be further extended.

The light sources may emit infra-red (IR) light. As a result, the light sources are able to provide good illumination that the robot's camera is able to detect, but which does not cause a potential annoyance to a user by shining visual light.

The light sources may be positioned inside handle portions provided on the robot. This allows the light sources to be protected by the handle against damage from collisions with obstacles as the robot is navigating around an environment. In addition, the light sources do not need to be positioned externally on the robot in such a way that they could easily be caught or snagged on obstacles.

BRIEF DESCRIPTION OF THE DRAWINGS

In order that the present invention may be more readily understood, embodiments of the invention will now be described, by way of example, with reference to the following accompanying drawings, in which.

DETAILED DESCRIPTION OF THE INVENTION

Figure 1:
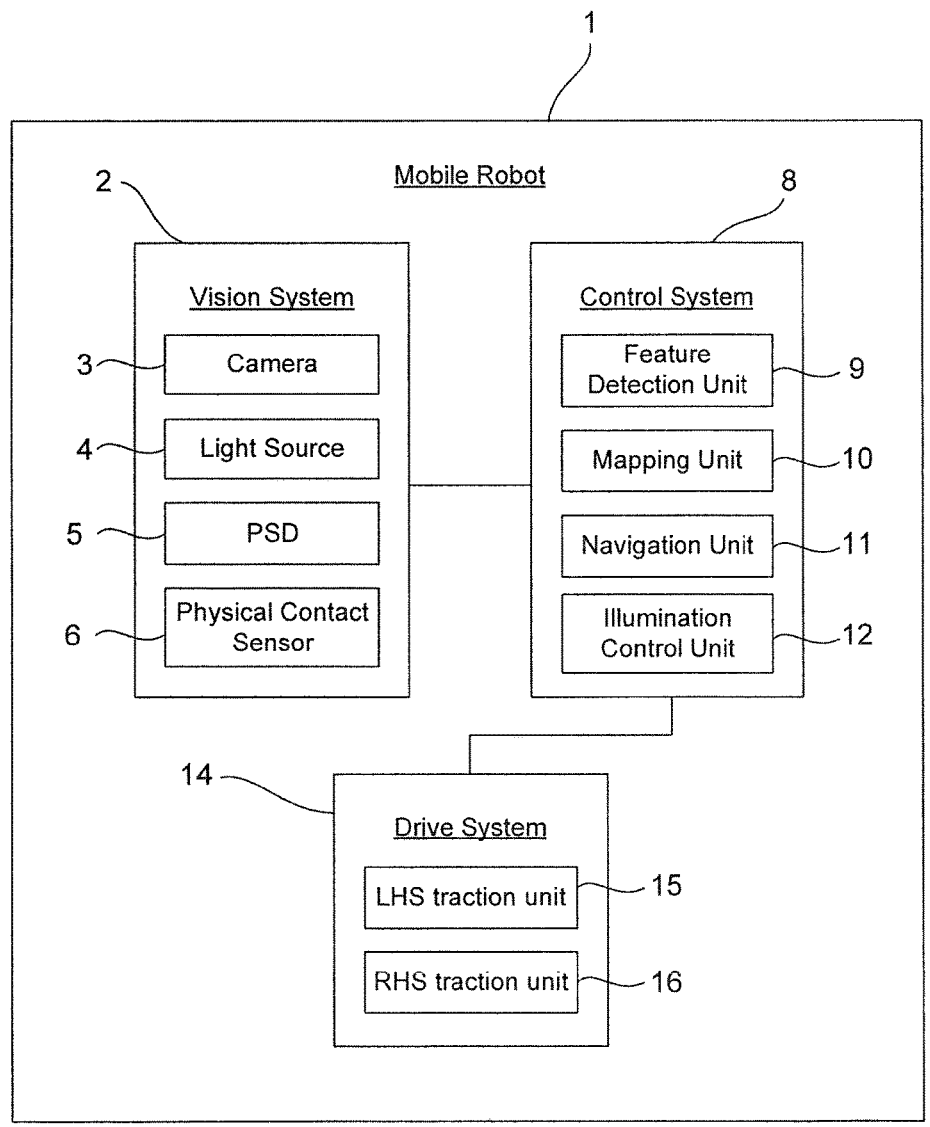
FIG. 1 is a schematic illustration of the components of a mobile robot.

FIG. 1 shows a schematic illustration of the components of a mobile robot 1. The mobile robot 1 comprises three systems: a vision system 2, a control system 8, and a drive system 14. The combination of these three systems allows the robot 1 to view, interpret and navigate around an environment in which the robot 1 is located. The vision system 2 comprises a camera 3 and a light source 4. The camera 3 is capable of capturing images of an area surrounding the mobile robot 1. For example, the camera 3 may be an upwardly directed camera to capture images of the ceiling, a forward-facing camera to capture images in a forward travelling direction of the robot 1, or may be a panoramic annular lens (PAL) camera that captures a 360° view of the area surrounding the robot 1. The light source 4 is able to improve the quality of the images captured by the camera 3 when the robot 1 is located in an environment that has low-light conditions, or where the images captured by the camera 3 suffer from poor contrast. The light source 4 may be any light source, for example the light source 4 is a light-emitting diode (LED). The light source 4 can provide a level of illumination to the area surrounding the robot 1. The light source 4 may emit light of any bandwidth that the camera's sensor is able to detect in order to improve the quality of the images captured by the camera 3. For example, the light emitted by the light source 4 may be within the visible, near infrared (NIR) or infrared (IR) parts of the electromagnetic spectrum.

The vision system 2 of mobile robot 1 may include a number of other types of sensors that provide the robot 1 with information about its surrounding environment. Two examples are shown in FIG. 1: a position sensitive device (PSD) 5 and a physical contact sensor 6. The PSD 5 may be a proximity sensor, for example, an IR sensor or a sonar sensor, and is able to give an indication of any obstacles that may be near the robot 1. This allows the robot 1 to avoid obstacles without making contact with them. The physical contact sensor 6 lets the robot 1 know when contact has been made with an obstacle. In response to a signal from the physical contact sensor 6, the robot can for example stop and/or adjust its position and trajectory. This prevents the robot 1 from causing any damage to itself or to the obstacle with which it has made contact, particularly when the obstacle has not been detected by the PSD 5.

All the information and data gathered by the vision system 2 is fed into the control system 8. The control system 8 comprises a feature detection unit 9. The feature detection unit 9 receives the images captured by the vision system 2 and analyses the images to find landmark features within the area surrounding the robot 1 shown in the images. Landmark features are high-contrast features that are easily detected within the image, for example the edge of a table, or the corner of a picture frame. The landmark features detected by the feature detection unit 9 can then be used by the navigation unit 10 and mapping unit 11 to triangulate and determine the position of the robot within the local environment. The mapping unit 10 can also use the information from the images and data captured from the other sensors in the vision system 2 to create a map of the environment which the robot 1 uses to interpret and navigate the environment. The feature detection unit 9, mapping unit 10 and navigation unit 11 may form part of a single encompassing simultaneous localisation and mapping (SLAM) unit in the robot 1 and are not required to be separate entities as shown in FIG. 1.

Instructions are sent from the control system 8 to the drive system 14 which causes the robot to move. The drive system 14 is shown in FIG. 1 as comprising a left hand side (LHS) traction unit 15 and a right hand side (RHS) traction unit 16. Each traction unit 15, 16 can be independently controlled such that the robot 1 can be steered. For example, if the RHS traction unit 16 is driven in a forward direction faster than the LHS traction unit 15, then the robot will veer to the left as it moves forward, or as a further example if the LHS and RHS traction units 15, 16 are each driven at the same speed but in opposite directions then the robot 1 will turn on the spot. The drive system 14 may also send data back to the control system 8. For example, data sent from the drive system to the control system 8 may be an indication of distance traveled by a traction unit (e.g. by using the number of revolutions of a wheel).

The control system 8 also comprises an illumination control unit 12. The illumination control unit 12 sends instructions, such as control signals, to the vision system 2 to adjust the level of illumination provided by the light source 4. For the robot 1 to be able to successfully navigate around an environment, there is a minimum number of landmark features that the feature detection unit 9 must be able to detect. Therefore, if the robot 1 is attempting to navigate in low-light conditions and the feature detection unit 9 is unable to detect the minimum number of features, the Illumination control unit 12 sends an instruction to the vision system 2 to increase the intensity of the light source 4.

If the light source were to be used when it is not necessary (for instance when the ambient light level is sufficient to detect the minimum number of features), then the light source 4 would be unnecessarily using power from the batteries and reducing the battery life of the robot 1. Therefore, when the number of landmark features detected by the feature detection unit 9 is greater than the minimum number required for successful navigation, the illumination control unit 12 also sends an instruction to the vision system 2 to decrease the intensity of the light source 4.

Increases and decreases in the level of illumination can be done in a variety of ways. For example, an algorithm can be utilised to determine the optimum level of illumination required. When the illumination control unit 12 sends an instruction for the level of illumination to be changed, it does so by a small amount each time and the process is repeated until an acceptable level of illumination is reached. The level of illumination is adjusted by increasing or decreasing the power supplied to the light source 4, which will cause a change in the intensity of the light emitted by the light source 4. Accordingly, when referring to adjusting the level of illumination provided by the light source, it will be understood that this is equivalent to adjusting the power supplied to the light source. By reducing the power supplied to the light source 4 when a lower level of illumination is required, the energy efficiency and battery life of the robot 1 can be increased.

The number of features being detected by the feature detection unit is continually monitored, and so the level of illumination is also continually controlled. The small adjustment amounts may be a predetermined amount. Alternatively, the adjustment amount could be calculated on the fly to be proportional to the difference between the number of features being detected and the minimum number of features required for successful navigation. The calculated adjustment amount would then be sent to the vision system 2 along with the instruction to change the level of illumination.

Figure 2:
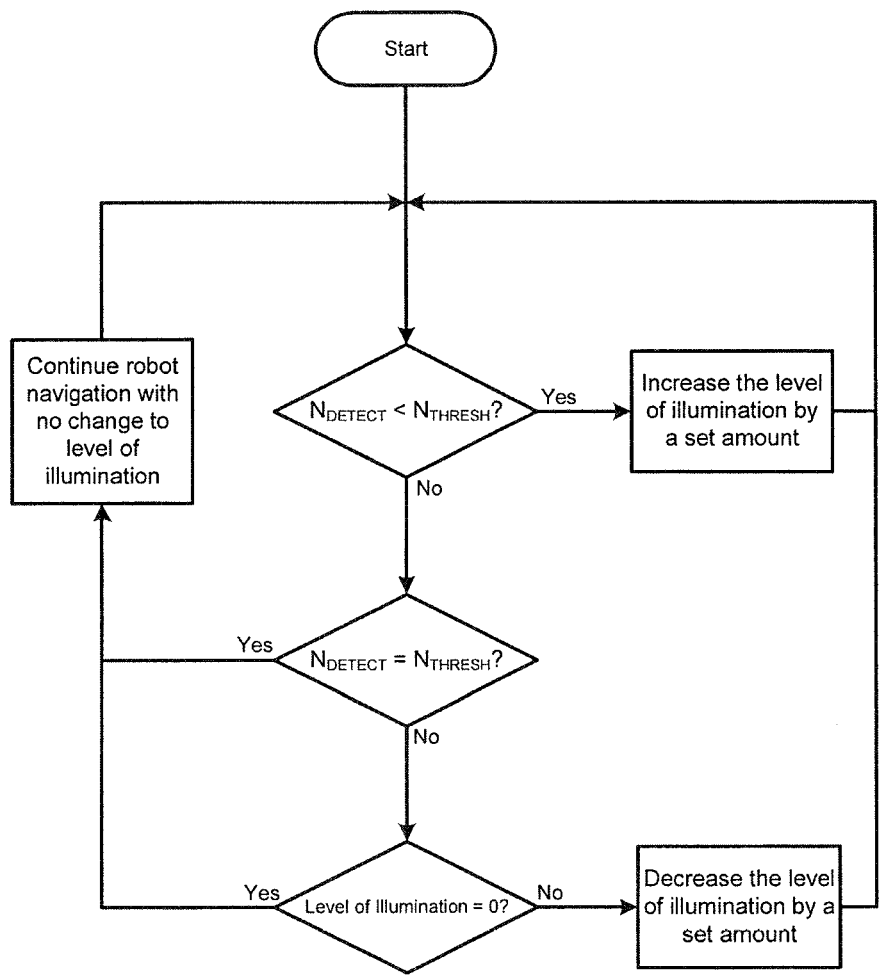
FIG. 2 is a flow diagram showing a process to control a level of illumination.

FIG. 2 is a flow diagram that shows a process of controlling the level of illumination from the light source 4. After starting, the robot determines whether the number of features detected (NDETECT) is less than a threshold number (NTHRESH). NTHRESH is a pre-determined threshold number that corresponds to the lowest number of landmark features required to allow the robot to successfully use SLAM techniques to navigate around an environment. If the NDETECT is less than NTHRESH (NDETECT<NTHRESH) then the level of illumination is increased by a set amount, and the process repeats. If NDETECT is not less than NTHRESH then the robot determines whether NDETECT is equal to NTHRESH (NDETECT=NTHRESH). If NDETECT=NTHRESH, then the level of illumination remains unchanged and the robot continues to navigate. Alternatively, if NDETECT≠NTHRESH, then it can be deduced that NDETECT is greater than NTHRESH (NDETECT>NTHRESH). The robot then checks to see if the level of illumination is already at zero. If the level of illumination is not zero, then the level of illumination is decreased by a set amount, and then the process is repeated. However, if the level of illumination is already at zero, then the robot continues to navigate.

The process of FIG. 2 increases and decreases the level of illumination by a pre-determined set amount but, as has already been described earlier, the amount of adjustment of the level of illumination may be variable and could, for example, be proportional to the difference between NDETECT and NTHRESH.

Figure 3:
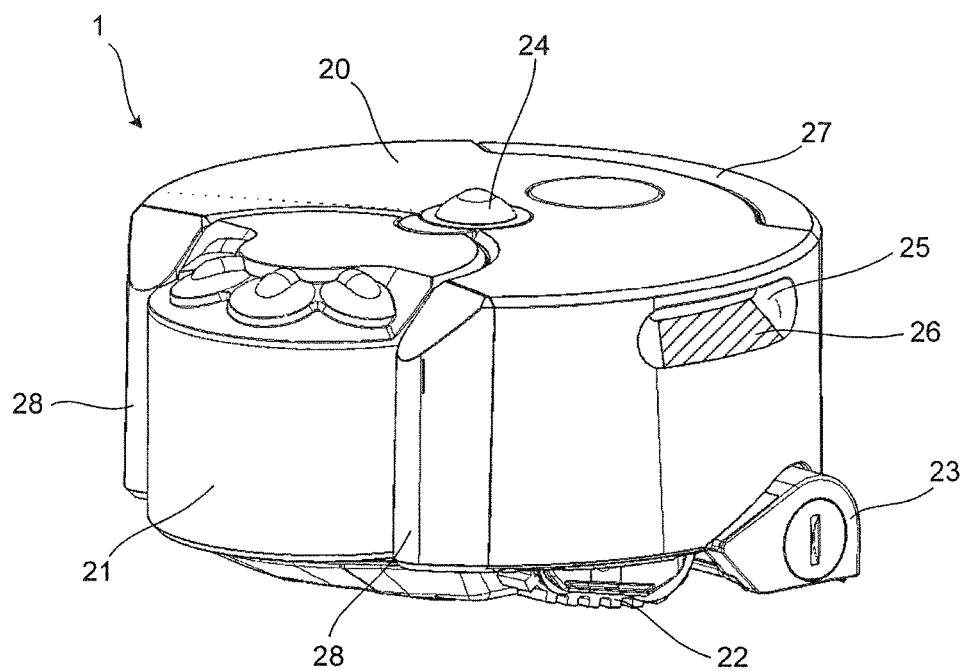
FIGS. 3, 4 and 5 show a mobile robot.

FIG. 3 shows a robot vacuum cleaner 1 comprising a main body 20 and a separating apparatus 21. The main body 20 comprises traction units 22 in the form of continuous tank tracks, and also a cleaner head 23 which houses a brushbar, and through which dirty air can be drawn into the robot vacuum cleaner 1 and passed into the separating apparatus 21. Once the air has been cleaned of dirt in the separating apparatus, it passes out of the separating apparatus 21 and through the main body 20 which houses a motor and fan for generating the airflow. The air is then expelled from the robot 1 through a vent 27 in the rear of the machine. The vent 27 is removable to provide access to filters in order that they can be cleaned and also to the power source for the robot 1 which is a battery pack. The main body 20 also comprises a camera 24 which the robot 1 uses to capture images of the area surrounding the robot 1. The camera 24 is a panoramic annular lens (PAL) camera, which is an omni-directional camera capable of capturing 360° images of the area surrounding the robot. A control system of the robot, which is embodied within the software and electronics contained within the robot, is able to use simultaneous localisation and mapping (SLAM) techniques to process the images captured by the camera 24 and this allows the robot 1 to understand, interpret and autonomously navigate the local environment.

Sensor covers 28 cover other sensors that are carried by the main body 20, such as PSD sensors. Under each of the sensor covers 28 are an array of sensors that are directed in different directions such that obstacles can not only be detected in front of the robot, but also towards the sides. Side PSD sensors can pick up obstacles in the periphery of the robot, and also can be used to help the robot navigate in a wall-following mode, where the robot travels as close and as parallel to a wall of a room as possible. There are also PSD sensors pointing downwards towards the ground that act as cliff sensors and which detect when the robot is approaching a drop, such as a staircase. When a drop is detected, the robot then can stop before it reaches the drop and/or adjust its trajectory to avoid the hazard. No physical contact sensor is visible in the figures. Whilst some robots use moveable bumper portions as physical contact sensors, this robot 1 detects relative movement between separate chassis and body portions of the main body 20 to register physical contact with an obstacle.

Figure 4:
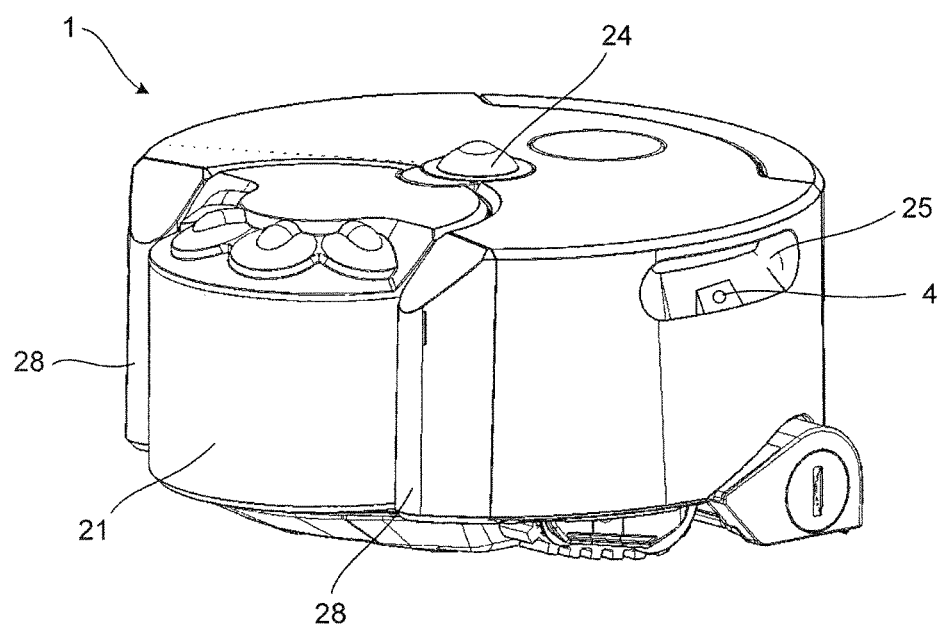

The main body 20 of the robot 1 comprises a handle 25 on the side of the main body 20. A similar handle that cannot be seen in this view is provided on the other side of the main body 20, such that a user can use the two handles 25 to grasp and lift the robot 1. The handle 25 comprises an inwardly protruding portion of the side wall of the main body 20. This makes it easy for a user to grasp the robot securely, but without requiring external handles on the main body 20 which could easily be caught or snagged on furniture or other obstacles within the local environment. An inner surface 26 of the handle 25 which faces in an outwardly direction is formed of a transparent material, and acts as a window. FIG. 4 shows the same robot 1 but where the surface 26 has been removed. Inside the main body 20 of the robot, and located behind the surface 26 is a light source 4. The light source 4 shown in FIG. 4 is a light-emitting diode (LED), but could be any source that emits light for example an incandescent bulb or an electroluminescent material. The light emitted by the light source can be of any wavelength that is detectable by the camera 24. The light may be visible or invisible to humans, and could for example be IR or NIR light.

Figure 5:
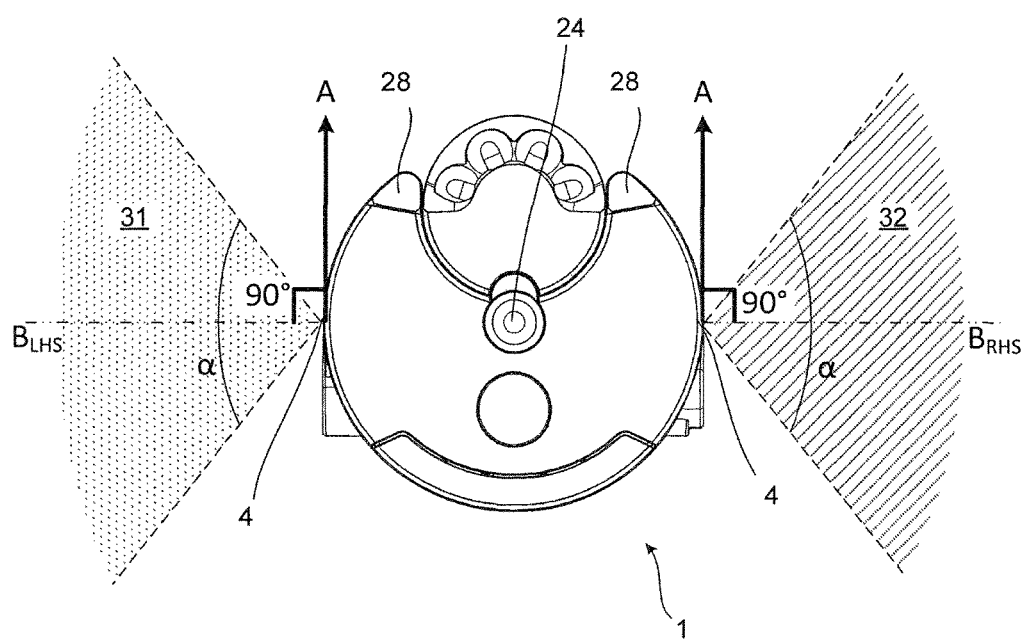

The light sources 4, in the form of LEDs, are arranged on the robot 1 such that they will illuminate separate areas surrounding the robot corresponding to different sections of an image captured by the camera. Each handle is located on a side of the robot 1, such that the light source 4 is positioned to direct light out from the robot in a direction that is orthogonal relative to a forward driving direction of the robot 1. Within the context of this document, orthogonal is intended to mean generally out to the left and/or right side of the machine within the context of this document, and not vertically up or down towards the ceiling or floor. This is clearly shown in FIG. 5 which shows a plan view of the robot 1. Arrows A indicate the forward driving direction of the robot 1, and dashed lines BLHS and BRHS represent the direction in which the left hand side (LHS) and right hand side (RHS) light sources 4 are pointing. Lines BLHS and BRHS are shown to be pointing in a direction that is 90° (orthogonal) to the arrow A either side of the robot 1. Therefore, an area to each side of the robot 1 orthogonal to a forward direction of travel of the robot can be illuminated.

Because the camera 24 is an omni-directional PAL camera the light sources 4 will illuminate portions of the image captured by the camera that correspond to either side of the robot, but not necessarily in front of the robot. This makes it easier for the robot to navigate, because as it travels in a forward direction, it travels past features on either side, and movement of the features within these portions of the image is easy to track in order to identify movement of the robot within the environment. If the camera was only able to use features in front of it to navigate, it would have to use the change in relative size of an object in order to identify movement. This is much harder and far less accurate. What is more, triangulation is much easier when features used to triangulate are spaced apart, rather than being grouped close together. It is less important for the robot's vision system to be able to detect obstacles it approaches from the front because the robot 1 is provided with an array of sensors behind sensor covers 28 that are able to detect obstacles in front of the robot without requiring the obstacle to be illuminated. In addition, there is a physical contact sensor which is able to detect when the robot 1 actually makes contact with an obstacle.

Each light source 4 emits a cone of light 31 and 32 which spans an angle α. Angle α can be any angle that meets the requirements of the vision system for the robot 1. When two light sources are provided on the robot as in FIG. 5, a cone angle α within the range of around 90° to 160° has been found to provide a good area of illumination for the vision system. An angle of around 120° is employed in the robot shown in FIG. 5.

The cone of light emitted by a light source can be a circular cone. Alternatively the cone of light may be an elliptical cone. The dimensions of a typical room are such that a wall is longer than it is high, and so an elliptical cone of light that is wider than it is high (i.e. it has a greater horizontal extent than it does vertical extent) would illuminate a room more efficiently.

As described above, the light sources are actively controlled during navigation to provide a level of illumination to the area surrounding the robot that is proportional to the number of features that the vision system is able to detect. However, to improve the power efficiency and battery life of the robot even further, the light sources can also be controlled independently from each other such that the level of illumination provided by each of the light sources is independently adjustable. This means that if the area to the right of the robot 1 (relative to the forward driving direction A) is dark, but the area to the left of the robot 1 is light, then the power to the light source 4 pointing in the direction BRHS can be increased independently so that the cone of light 32 gives a higher level of illumination than the cone of light 31 which points out in direction BLHS. This means that if only one side of the robot 1 requires illuminating, power and battery life is not wasted illuminating the other side of the robot unnecessarily.

Figure 6:
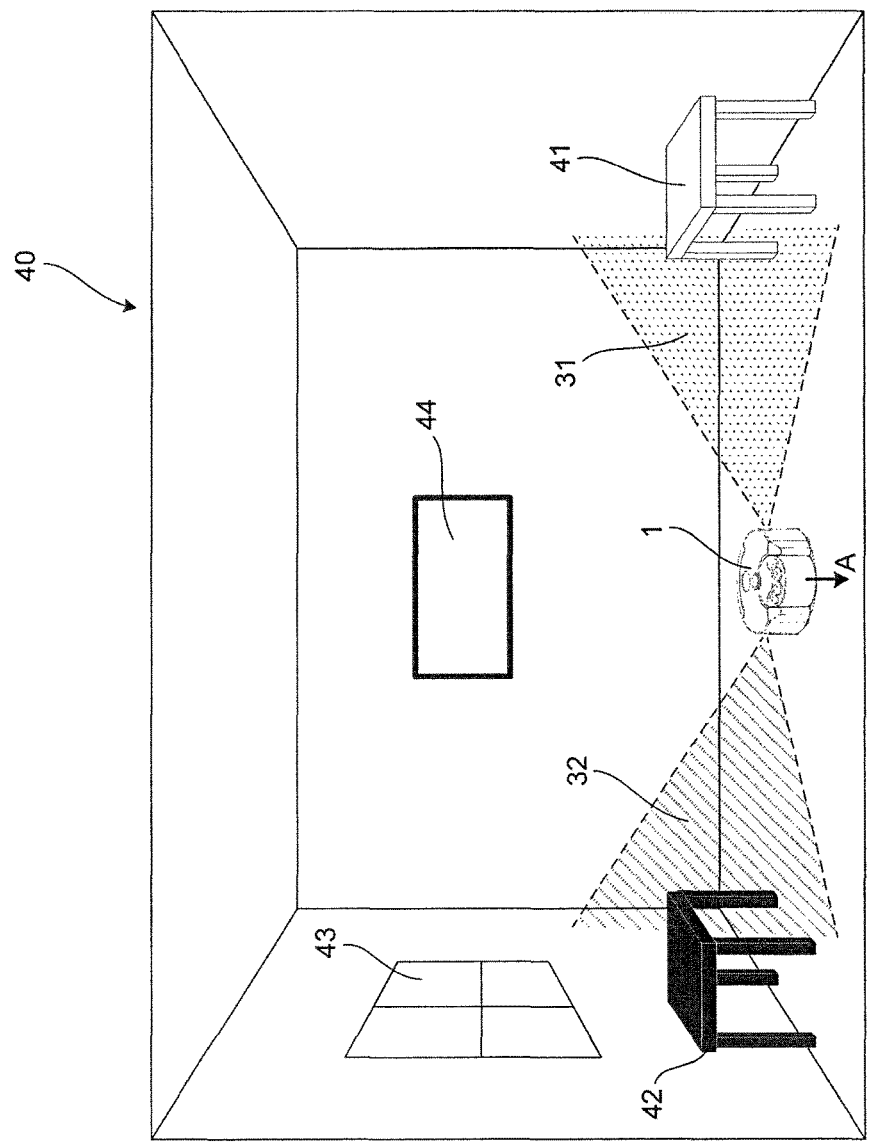
FIG. 6 shows a mobile robot located within a room environment.
Figure 7B:
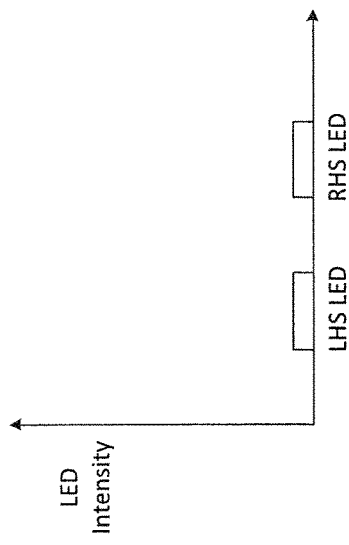
FIGS. 7B and 8B are graphs showing the corresponding LED intensity used in the captured images of 7A and 8A.
Figure 7A:
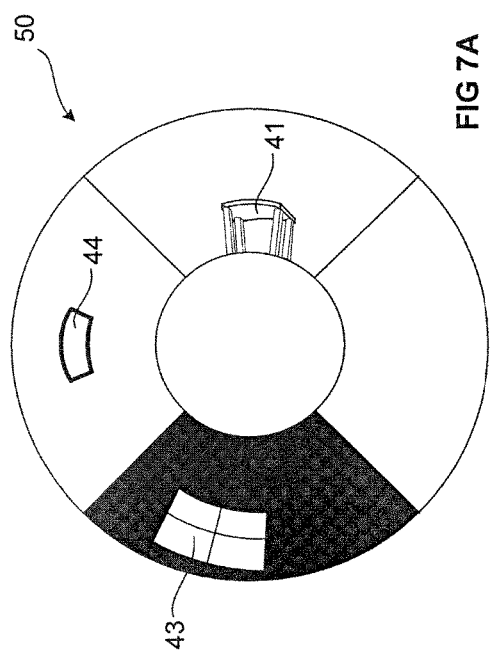
FIGS. 7A and 8A show examples of images captured by the camera of the mobile robot shown in FIG. 6.

FIG. 6 shows the robot 1 within a room 40. Inside the room 40 are a number of articles that could provide landmark features for the robot's vision system to utilise. A light-coloured table 41 is on the left of the robot (relative to the forward driving direction A of the robot) and a dark-coloured table 42 is on its right. A window 43 is also located on the right of the robot above the table 42, and a picture frame 44 is on the wall behind the robot. The robot 1 is the same robot shown in FIG. 5 and so has two light sources that are able to provide independently controlled cones of light 31 and 32 either side of the robot. FIG. 7A is a representation of a 360° image 50 captured by the omni-directional PAL camera on robot 1 when in the environment shown in FIG. 6. FIG. 7B is a graph that shows the relative levels of LED intensity that was used for each of the light sources on the sides of the robot 1 when the image in FIG. 7A was taken.

LHS LED represents the light source that points in direction BLHS, and RHS LED represents the light source that points in direction BRHS. Both LEDs have very little power being provided to them, and so the LED intensity of each is very low. This means that a very low level of illumination is being shone onto the area surrounding the robot 1. The image 50 shows that light from the window 43 is sufficiently illuminating the opposite side of the room, and so both the table 41 and picture frame 44 can clearly be seen. However, because of the amount of light entering the window 43, there is poor contrast around the window 43 and so table 42 cannot be seen in the image 50 of FIG. 7A.

Figure 8B:
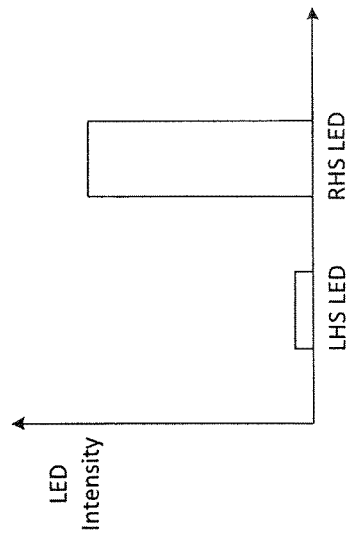
Figure 8A:
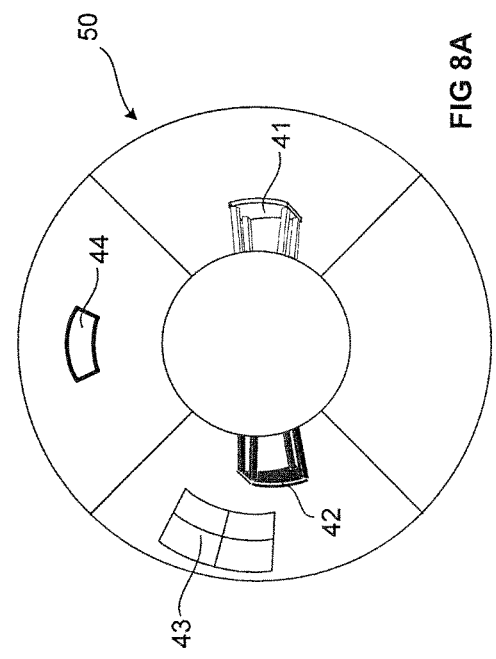

It could be the case that the image 50 shown in FIG. 7A may provide enough detectable features for the robot 1 to successfully navigate. However, if the control system determines that not enough detectable features are available to the right hand side of the robot due to the poor contrast, it can send an instruction to the vision system to increase the level of illumination on that side. The subsequent situation is shown the FIGS. 8A and 8B. Graph 8B shows that the LED intensity of LHS LED has not been changed, but that the LED intensity of RHS LED is increased. As a consequence, the area surrounding the robot 1 to its right has been illuminated by the cone of light 32, and table 42 is now visible in the image 50 of FIG. 8A. The control system will now be able to use parts of the visible table 42 as landmark features in order to navigate the robot 1 around its environment.

Figure 9:
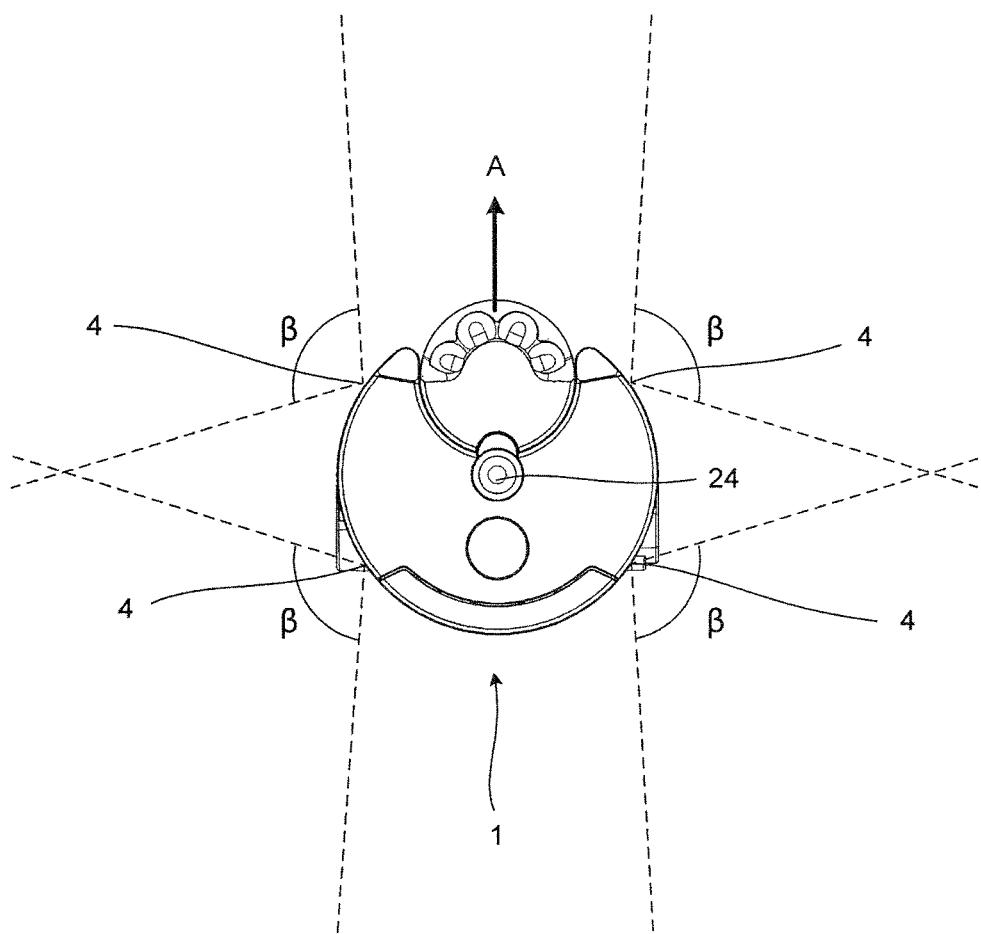
FIGS. 9, 10 and 11 show further embodiments of a mobile robot.

The robot 1 has so far been shown and described as comprising two light sources 4, with each light source providing a level of illumination to areas surrounding the robot on left and right hand sides of the device. However, a robot maybe provided with more than two light sources, an example of which is shown in FIG. 9. In FIG. 9 the robot 1 is provided with four light sources 4, with each light source emitting a cone of light having a cone angle of angle β. All four light sources 4 are still directed outwards so as to provide illuminate to each of the left and right sides of the robot. As there are more light sources, the angle β can be less than the previously described cone angle α. Although the area surrounding the robot that is illuminated by the four light sources is substantially the same that was illuminated by two light sources in the previous embodiment, the number of separately illuminatable regions within the image captured by the omni-directional PAL camera has doubled. Therefore, even though more light sources are provided, because there is greater control over which sections of the image are illuminated more energy could be saved and the battery life can be extended further. This model could be extended to include even more light sources if desired.

Figure 10:
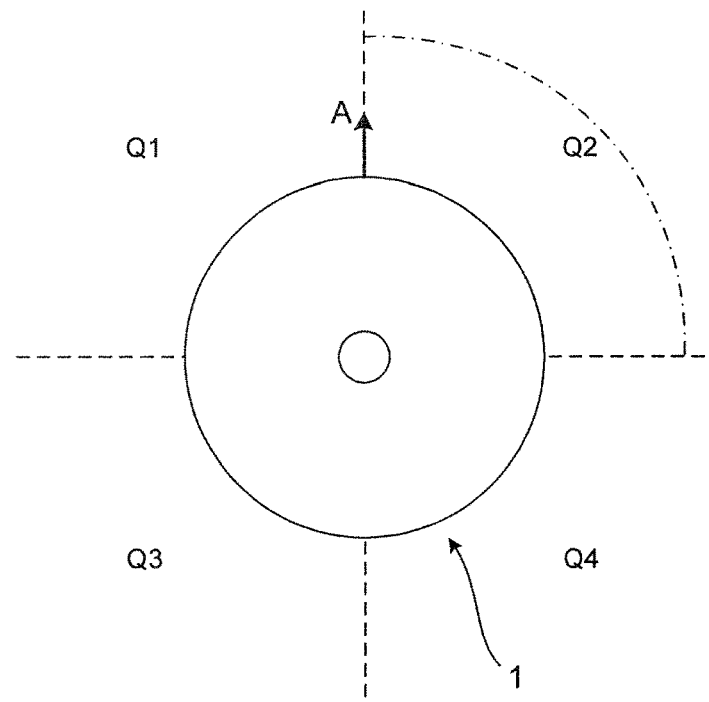
Figure 11:
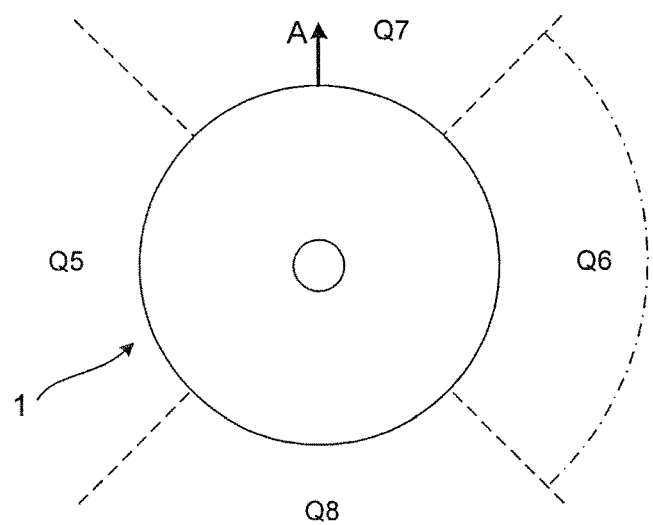

FIGS. 10 and 11 show robots 1 that contain a number of light sources (not shown) that effectively illuminate different quadrants (Q1 to Q4 and Q5 to Q8) around the robot 1. As such, the control system can send instructions to the vision system to independently control the level of illumination provided to each quadrant surrounding the robot. In FIG. 10 the quadrants are positioned such that the forward driving direction of the robot (arrow A) is aligned with the border between two quadrants Q1 and Q2. FIG. 11 shows an alternative embodiment where the forward driving direction of the robot (arrow A) passes through the middle of a quadrant Q7. In other embodiments, the light sources may be arranged to independently illuminate more or less sections than four quadrants.

Whilst particular embodiments have thus far been described, it will be understood that various modifications may be made without departing from the scope of the invention as defined by the claims.

The invention claimed is:

1. A mobile robot comprising:
   a vision system, the vision system comprising a camera and two or more light sources each arranged to provide a level of illumination to an area surrounding the mobile robot; and
   a control system configured for processing images captured by the camera to detect high contrast features within the images and to use detected high contrast features to triangulate the mobile robot within an environment,
   wherein the two or more light sources are arranged to illuminate separate areas surrounding the robot corresponding to different sections of an image captured by the camera, and the level of illumination provided by each of the light sources is independently adjustable, and
   wherein the level of illumination provided by each one of the two or more light sources is independently adjustable in response to a quantity of high contrast features detected by the control system within the images captured by the camera.

2. The mobile robot of claim 1, wherein the level of illumination provided by each of the light sources is independently adjusted in response to the quantity of features detected by the control system within corresponding sections of the image illuminated by each light source.

3. The mobile robot of claim 1, wherein the two or more light sources are arranged to illuminate a combined area that corresponds to between a quarter and three quarters of the overall image captured by the camera.

4. The mobile robot of claim 1, wherein the two or more light sources are arranged on the robot such that they illuminate separate areas that are on opposite sides of the robot.

5. The mobile robot of claim 1, wherein when the vision system comprises two light sources, each light source is arranged on opposite sides of the robot to emit light in an opposite direction to the other light source.

6. The mobile robot of claim 1, wherein the vision system comprises at least four light sources.

7. The mobile robot of claim 6, wherein the at least four light sources are arranged to illuminate a different quadrant area surrounding the robot.

8. The mobile robot of claim 1, wherein the level of illumination provided by each of the light sources is adjusted by increasing and decreasing the power provided to each of the light sources.

9. The mobile robot of claim 1, wherein the level of illumination provided by each of the light sources is independently adjusted in response to a control signal sent to the vision system by the control system.

10. The mobile robot of claim 9, wherein the control system comprises a simultaneous localisation and mapping (SLAM) unit.

11. The mobile robot of claim 1, wherein the camera is a panoramic annular lens (PAL) camera.

12. The mobile robot of claim 1, wherein the light sources comprise light-emitting diodes (LEDs).

13. The mobile robot of claim 1, wherein the light sources emit infra-red (IR) light.

14. The mobile robot of claim 1, wherein the light sources are positioned inside handle portions provided on the robot.

* * * * *